US008666559B2

(12) United States Patent
Verfuerth et al.

(10) Patent No.: US 8,666,559 B2
(45) Date of Patent: Mar. 4, 2014

(54) SYSTEM AND METHOD FOR REDUCING PEAK AND OFF-PEAK ELECTRICITY DEMAND BY MONITORING, CONTROLLING AND METERING HIGH INTENSITY FLUORESCENT LIGHTING IN A FACILITY

(75) Inventors: Neal R. Verfuerth, Manitowoc, WI (US); Michael J. Potts, Plymouth, WI (US); Jun Wang, Sheboygan, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 0 days.

(21) Appl. No.: 13/609,096

(22) Filed: Sep. 10, 2012

(65) Prior Publication Data
US 2013/0006437 A1    Jan. 3, 2013

Related U.S. Application Data (63) Continuation of application No. 12/057,217, filed on Mar. 27, 2008.

(51) Int. Cl.
*G05D 25/02*    (2006.01)
(52) U.S. Cl.
USPC ............. 700/295; 700/291; 700/296; 700/11; 700/22
(58) Field of Classification Search
None
See application file for complete search history.

(56) References Cited

U.S. PATENT DOCUMENTS

| | | |
|---|---|---|
| 1,254,520 A | 1/1918 | MaCduff |
| 2,403,240 A | 7/1946 | Sawin |
| 2,485,148 A | 10/1949 | Fralin |
| 2,636,977 A | 4/1953 | Foster |
| 3,292,319 A | 12/1966 | McCarthy |
| 3,337,035 A | 8/1967 | Pennybacker |
| 3,416,266 A | 12/1968 | Eron |
| 3,511,559 A | 5/1970 | Foster |
| 3,757,290 A | 9/1973 | Ross et al. |
| 4,023,043 A | 5/1977 | Stevenson |
| 4,114,186 A | 9/1978 | Dominguez |
| 4,135,181 A | 1/1979 | Bogacki et al. |
| 4,144,462 A | 3/1979 | Sieron et al. |

(Continued)

FOREIGN PATENT DOCUMENTS

WO    WO-2004/023849 A1    3/2004

OTHER PUBLICATIONS

U.S. Appl. No. 13/249,001, Sep. 29, 2011, Verfuerth et al.
U.S. Appl. No. 13/275,536, Oct. 18, 2011, Verfuerth et al.

(Continued)

*Primary Examiner* — Kavita Padmanabhan
*Assistant Examiner* — Christopher E Everettt
(74) *Attorney, Agent, or Firm* — Foley & Lardner LLP (57) ABSTRACT

A method of reducing electricity usage during peak demand periods includes the steps of establishing predetermined load reduction criteria representative of a desire by a power provider to reduce loading on an electricity supply grid, and coordinating with a facility having lighting equipment to permit the power provider to turn-off one or more of the lighting equipment by sending instructions to a master controller at the facility in response to the predetermined load reduction criteria, and establishing a list of lighting equipment to be turned-off in response to the instructions, and configuring the master controller to send an override control signal to the lighting equipment to implement the instructions, and configuring the lighting equipment to send a response signal to the master controller providing a status of the lighting equipment.

21 Claims, 5 Drawing Sheets

(56) References Cited

U.S. PATENT DOCUMENTS

| | | | |
|---|---|---|---|
| 4,190,800 A | 2/1980 | Kelly et al. | |
| 4,204,194 A | 5/1980 | Bogacki | |
| 4,204,195 A | 5/1980 | Bogacki | |
| 4,306,769 A | 12/1981 | Martinet | |
| 4,360,881 A | 11/1982 | Martinson | |
| 4,387,417 A | 6/1983 | Plemmons et al. | |
| 4,489,386 A | 12/1984 | Breddan | |
| 4,727,593 A | 2/1988 | Goldstein | |
| 4,733,505 A | 3/1988 | Van Dame | |
| 4,809,468 A | 3/1989 | Bareiss | |
| 4,841,914 A | 6/1989 | Chattan | |
| 4,860,511 A | 8/1989 | Weisner et al. | |
| 4,883,340 A | 11/1989 | Dominguez | |
| 4,998,095 A | 3/1991 | Shields | |
| 5,099,622 A | 3/1992 | Sutton | |
| 5,253,444 A | 10/1993 | Donoho et al. | |
| 5,261,179 A | 11/1993 | Schwinler | |
| 5,353,543 A | 10/1994 | Teraoka | |
| 5,371,661 A | 12/1994 | Simpson | |
| 5,426,620 A | 6/1995 | Budney | |
| 5,546,712 A | 8/1996 | Bixby | |
| 5,572,438 A | 11/1996 | Ehlers et al. | |
| 5,598,042 A | 1/1997 | Mix et al. | |
| 5,644,173 A | 7/1997 | Elliason et al. | |
| 5,649,394 A | 7/1997 | Ohba | |
| 5,655,339 A | 8/1997 | DeBlock et al. | |
| 5,713,160 A | 2/1998 | Heron | |
| 5,717,609 A | 2/1998 | Packa et al. | |
| 5,729,387 A | 3/1998 | Takahashi et al. | |
| 5,758,331 A | 5/1998 | Johnson | |
| 5,836,114 A | 11/1998 | Ohba | |
| 5,918,404 A | 7/1999 | Ohba | |
| 5,956,462 A | 9/1999 | Langford | |
| 5,962,989 A | 10/1999 | Baker | |
| 6,003,471 A | 12/1999 | Ohba | |
| 6,122,603 A | 9/2000 | Budike, Jr. | |
| 6,169,979 B1 | 1/2001 | Johnson | |
| 6,257,735 B1 | 7/2001 | Baar | |
| D447,266 S | 8/2001 | Verfuerth | |
| 6,363,667 B2 | 4/2002 | O'Neill | |
| 6,367,419 B1 | 4/2002 | Gosselin | |
| 6,418,674 B1 | 7/2002 | Deraedt | |
| D463,059 S | 9/2002 | Verfuerth | |
| 6,467,933 B2 | 10/2002 | Baar | |
| 6,528,957 B1 | 3/2003 | Luchaco | |
| 6,535,859 B1 | 3/2003 | Yablonowski et al. | |
| 6,585,396 B1 | 7/2003 | Verfuerth | |
| D479,826 S | 9/2003 | Verfuerth et al. | |
| 6,622,097 B2 | 9/2003 | Hunter | |
| 6,633,823 B2 | 10/2003 | Bartone et al. | |
| 6,644,836 B1 | 11/2003 | Adams | |
| D483,332 S | 12/2003 | Verfuerth | |
| 6,671,586 B2* | 12/2003 | Davis et al. | 700/295 |
| 6,717,660 B1 | 4/2004 | Bernardo | |
| 6,731,080 B2 | 5/2004 | Flory | |
| D494,700 S | 8/2004 | Hartman et al. | |
| 6,785,592 B1 | 8/2004 | Smith et al. | |
| 6,813,864 B2 | 11/2004 | Landis | |
| 6,828,695 B1 | 12/2004 | Hansen | |
| 6,832,135 B2 | 12/2004 | Ying | |
| 6,894,609 B2* | 5/2005 | Menard et al. | 340/531 |
| 6,938,210 B1 | 8/2005 | Huh | |
| 6,979,097 B2 | 12/2005 | Elam et al. | |
| 6,983,210 B2 | 1/2006 | Matsubayashi et al. | |
| 6,990,394 B2* | 1/2006 | Pasternak | 700/295 |
| 7,027,736 B1 | 4/2006 | Mier-Langner et al. | |
| 7,130,719 B2* | 10/2006 | Ehlers et al. | 700/276 |
| 7,130,832 B2 | 10/2006 | Bannai et al. | |
| 7,167,777 B2 | 1/2007 | Budike, Jr. | |
| 7,264,177 B2 | 9/2007 | Buck et al. | |
| D557,817 S | 12/2007 | Verfuerth | |
| 7,307,542 B1* | 12/2007 | Chandler et al. | 340/9.16 |
| D560,469 S | 1/2008 | Bartol et al. | |
| 7,369,056 B2 | 5/2008 | McCollough, Jr. | |
| 7,401,942 B1 | 7/2008 | Verfuerth et al. | |
| 7,518,531 B2 | 4/2009 | Butzer et al. | |
| D595,894 S | 7/2009 | Verfuerth et al. | |
| 7,563,006 B1 | 7/2009 | Verfuerth et al. | |
| 7,575,338 B1 | 8/2009 | Verfuerth | |
| D606,697 S | 12/2009 | Verfuerth et al. | |
| 7,628,506 B2 | 12/2009 | Verfuerth et al. | |
| 7,638,743 B2 | 12/2009 | Bartol et al. | |
| 7,660,652 B2 | 2/2010 | Smith et al. | |
| D617,028 S | 6/2010 | Verfuerth et al. | |
| D617,029 S | 6/2010 | Verfuerth et al. | |
| 7,738,999 B2* | 6/2010 | Petite | 700/295 |
| 7,746,003 B2 | 6/2010 | Verfuerth et al. | |
| 7,762,861 B2 | 7/2010 | Verfuerth et al. | |
| D621,410 S | 8/2010 | Verfuerth et al. | |
| D621,411 S | 8/2010 | Verfuerth et al. | |
| 7,780,310 B2 | 8/2010 | Verfuerth et al. | |
| 7,784,966 B2 | 8/2010 | Verfuerth et al. | |
| D623,340 S | 9/2010 | Verfuerth et al. | |
| 7,812,543 B2 | 10/2010 | Budike, Jr. | |
| 7,847,706 B1 | 12/2010 | Ross et al. | |
| 7,859,398 B2* | 12/2010 | Davidson et al. | 340/539.1 |
| D632,006 S | 2/2011 | Verfuerth et al. | |
| 8,033,686 B2 | 10/2011 | Recker et al. | |
| D650,225 S | 12/2011 | Bartol et al. | |
| 8,070,312 B2 | 12/2011 | Verfuerth et al. | |
| 8,138,690 B2 | 3/2012 | Chemel et al. | |
| 8,255,090 B2* | 8/2012 | Frader-Thompson et al. | 700/295 |
| 8,450,670 B2 | 5/2013 | Verfuerth et al. | |
| 2001/0055965 A1 | 12/2001 | Delp et al. | |
| 2002/0065583 A1* | 5/2002 | Okada et al. | 700/295 |
| 2002/0082748 A1 | 6/2002 | Enga et al. | |
| 2002/0103655 A1 | 8/2002 | Boies et al. | |
| 2002/0162032 A1 | 10/2002 | Gundersen et al. | |
| 2002/0172049 A1 | 11/2002 | Yueh | |
| 2003/0011486 A1 | 1/2003 | Ying | |
| 2003/0016143 A1 | 1/2003 | Ghazarian | |
| 2003/0036820 A1 | 2/2003 | Yellepeddy et al. | |
| 2003/0041017 A1 | 2/2003 | Spool et al. | |
| 2003/0041038 A1 | 2/2003 | Spool et al. | |
| 2003/0046252 A1 | 3/2003 | Spool et al. | |
| 2003/0084358 A1 | 5/2003 | Bresniker et al. | |
| 2003/0084359 A1 | 5/2003 | Bresniker et al. | |
| 2003/0093332 A1 | 5/2003 | Spool et al. | |
| 2003/0171851 A1 | 9/2003 | Brickfield et al. | |
| 2003/0179577 A1 | 9/2003 | Marsh | |
| 2004/0006439 A1 | 1/2004 | Hunter | |
| 2004/0024483 A1 | 2/2004 | Holcombe | |
| 2004/0076001 A1 | 4/2004 | Lutes | |
| 2004/0078153 A1 | 4/2004 | Bartone et al. | |
| 2004/0078154 A1 | 4/2004 | Hunter | |
| 2004/0083163 A1 | 4/2004 | Cooper | |
| 2004/0095237 A1 | 5/2004 | Chen et al. | |
| 2004/0128266 A1 | 7/2004 | Yellepeddy et al. | |
| 2004/0193329 A1 | 9/2004 | Ransom et al. | |
| 2005/0027636 A1 | 2/2005 | Gilbert et al. | |
| 2005/0034023 A1 | 2/2005 | Maturana et al. | |
| 2005/0035717 A1 | 2/2005 | Adamson et al. | |
| 2005/0038571 A1 | 2/2005 | Brickfield et al. | |
| 2005/0043860 A1* | 2/2005 | Petite | 700/291 |
| 2005/0124346 A1* | 6/2005 | Corbett et al. | 455/446 |
| 2005/0232289 A1* | 10/2005 | Walko et al. | 370/402 |
| 2006/0044152 A1 | 3/2006 | Wang | |
| 2006/0065750 A1 | 3/2006 | Fairless | |
| 2006/0085301 A1 | 4/2006 | Leahy | |
| 2006/0125426 A1 | 6/2006 | Veskovic et al. | |
| 2006/0253885 A1* | 11/2006 | Murphy et al. | 725/105 |
| 2007/0043478 A1* | 2/2007 | Ehlers et al. | 700/276 |
| 2007/0085701 A1* | 4/2007 | Walters et al. | 340/870.02 |
| 2007/0097993 A1* | 5/2007 | Bojahra et al. | 370/401 |
| 2007/0145915 A1 | 6/2007 | Roberge et al. | |
| 2007/0222581 A1* | 9/2007 | Hawkins et al. | 340/539.1 |
| 2008/0143273 A1 | 6/2008 | Davidson et al. | |
| 2008/0147465 A1 | 6/2008 | Raines et al. | |
| 2008/0183337 A1 | 7/2008 | Szabados | |
| 2008/0218317 A1* | 9/2008 | Choi | 340/286.01 |
| 2008/0266664 A1 | 10/2008 | Winston et al. | |
| 2008/0275802 A1 | 11/2008 | Verfuerth et al. | |
| 2009/0000217 A1 | 1/2009 | Verfuerth et al. | |

(56) References Cited

U.S. PATENT DOCUMENTS

| | | | |
|---|---|---|---|
| 2009/0147507 A1 | 6/2009 | Verfuerth et al. | |
| 2009/0150004 A1* | 6/2009 | Wang et al. | 700/286 |
| 2009/0222142 A1* | 9/2009 | Kao et al. | 700/291 |
| 2009/0243517 A1 | 10/2009 | Verfuerth et al. | |
| 2009/0248217 A1 | 10/2009 | Verfuerth et al. | |
| 2009/0251066 A1 | 10/2009 | Baaijens et al. | |
| 2009/0299811 A1 | 12/2009 | Verfuerth et al. | |
| 2009/0315485 A1 | 12/2009 | Verfuerth et al. | |
| 2010/0061088 A1 | 3/2010 | Bartol et al. | |
| 2010/0246168 A1 | 9/2010 | Verfuerth et al. | |
| 2011/0060701 A1 | 3/2011 | Verfuerth et al. | |
| 2011/0146669 A1 | 6/2011 | Bartol et al. | |
| 2011/0235317 A1 | 9/2011 | Verfuerth et al. | |
| 2011/0279063 A1 | 11/2011 | Wang et al. | |
| 2012/0037725 A1 | 2/2012 | Verfuerth | |
| 2012/0038281 A1 | 2/2012 | Verfuerth | |
| 2012/0038490 A1 | 2/2012 | Verfuerth | |
| 2012/0040606 A1 | 2/2012 | Verfuerth | |
| 2012/0044350 A1 | 2/2012 | Verfuerth | |
| 2012/0081906 A1 | 4/2012 | Verfuerth et al. | |
| 2012/0167957 A1 | 7/2012 | Verfuerth et al. | |
| 2012/0274222 A1 | 11/2012 | Verfuerth et al. | |

OTHER PUBLICATIONS

U.S. Appl. No. 13/296,058, Nov. 14, 2011, Verfuerth et al.
U.S. Appl. No. 13/333,293, Dec. 21, 2011, Verfuerth et al.
U.S. Appl. No. 61/466,411, Mar. 22, 2011, Verfuerth et al.
"About Sun Dome Tubular Skylights," having a date indication of © 2009, 8 pages.
Deru et al.; BigHorn Home Improvement Center Energy Performance; ASHRAE Transactions, Atlanta: 2006 vol. 112, 26 pages.
Galasiu et al. "Energy saving lighting control systems for open-plan offices: a filed study"; Jul. 2007, National Research Council Canada; vol. 4; No. 1, pp. 1-28, 56 pages.
Halliday, D., et al., Physics Part I and II; John Wiley& Sons, Inc. 1967 (9 pgs.).
Harris, L. R., et al., "Pacific Northwest Laboratory's Lighting Technology Screening Matrix," PNL-SA-23871, Apr. 1994, U.S. Department of Energy, Pacific Northwest Laboratory, Richland, Washington 99352, pp. 1-14.
Notice of Acceptance (NOA) from Miami-Dade County, Building Code Compliance Office, Product Control Division, Approval Date Dec. 13, 2007, 2 pages.
Sun-Dome /Tubular Skylight, Daylighting Technologies, Riviera Beach, FL, revision Oct. 22, 2007, 1 page.
Non-Final Office Action on U.S. Appl. No. 13/902,449 (F&L 042365-1013), mail date Aug. 28, 2013, 16 pages.
Non-Final Office Action on U.S. Appl. No. 13/932,962 (F&L 042365-1014), mail date Aug. 28, 2013, 10 pages.
Notice of Allowance on U.S. Appl. No. 11/744,083 (F&L 042365-0112), mail date Aug. 29, 2013, 8 pages.

* cited by examiner

SYSTEM AND METHOD FOR REDUCING PEAK AND OFF-PEAK ELECTRICITY DEMAND BY MONITORING, CONTROLLING AND METERING HIGH INTENSITY FLUORESCENT LIGHTING IN A FACILITY

CROSS-REFERENCE TO RELATED PATENT APPLICATIONS

This application is a Continuation of U.S. application Ser. No. 12/057,217, filed Mar. 27, 2008, incorporated herein by reference in its entirety.

FIELD

The field of the disclosure relates generally to reduction in energy usage. More specifically, the disclosure relates to systems and methods for intelligent monitoring, controlling and metering of high intensity fluorescent lighting equipment in a facility to reduce consumption of electricity during peak and off-peak demand periods.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

According to the International Energy Outlook 2006, Report No. DOE/EIA-0484(2006) from the U.S. Dept. of Energy, the world's total net electricity consumption is expected to more than double during the period 2003-2030. Much of the electricity is expected to be used to provide industrial, institutional, commercial, warehouse and residential lighting. Adoption of energy-efficient technologies can help to conserve electricity thereby slowing the growth in both the "base demand" and "peak demand" components of electricity demand. Base demand is the steady-state, or average, demand for electricity, while peak demand occurs when the demand for electricity is the greatest, for example, during a hot summer day when electricity use for air conditioning is very high. Reducing either type of demand is desirable, but a reduction in peak demand generally is more valuable because of the relatively high unit cost of the capacity required to provide the peak demand.

Many facilities (e.g. commercial, residential, industrial, institutional, warehouses, etc.) typically include (or are being modified to include) artificial lighting devices such as high intensity fluorescent ("HIF") lighting fixtures that reduce the amount of electricity consumed in comparison to other less efficient types of artificial lighting such as high intensity discharge ("HID") lighting. Although HIF lighting equipment reduces the consumption of electricity required for operation, it is desirable to further reduce the electricity consumed by HIF lighting equipment in a facility. Such lighting devices are often configured for control using relatively simplistic control schemes, such as "on" or "idle" during periods where the facility is regularly occupied, and "off" or "standby" when the facility is regularly unoccupied (typically referred to as the facility's "usage pattern"). It would be desirable to reduce consumption of energy by providing a system and method to permit a power provider to trim or shed certain predetermined loads in cooperation with a facility during peak demand periods. It would also be desirable to reduce consumption of energy during peak and off-peak demand periods by using sensing and control devices to intelligently monitor an environment within a facility to turn-off or reduce power to HIF lighting equipment in the facility, when operation of the equipment is unnecessary, particularly during regularly occupied periods which often correspond to peak demand times for the supplier of the electricity (e.g. utilities, etc.).

What is needed is a system and method for reducing peak and off-peak electricity usage in a facility by intelligently monitoring the need for operation of HIF lighting equipment in a facility, and turning-off the HIF lighting equipment during periods when operation of the HIF lighting equipment is determined to be unnecessary, or when peak demand electric capacity is limited and dictates a reduction in demand. What is also needed is a system and method to reduce electricity usage during peak demand periods by providing a signal from an electricity supplier to the HIF lighting equipment to turn-off certain equipment on an as-needed basis (e.g. during unplanned or unforeseen reductions in capacity, etc.) according to a pre-established plan with the facility to accomplish peak electric supply capacity objectives. What is further needed is a system and method to reduce electricity usage during peak demand periods by automatically providing a signal from an electricity supplier to the HIF lighting equipment to turn-off certain equipment, in accordance with a pre-established plan with the facility, in response to decreasing capacity margins during peak demand periods. What is further needed are suitable sensors operable to monitor the need for operation of the HIF lighting equipment during peak or off-peak demand periods at various locations within the facility. What is also needed is a control device operable to receive an indication of the need for operation of the HIF lighting equipment and to provide a demand-based control signal to turn-off such equipment during periods when operation of the HIF lighting equipment is unnecessary, or override the usage of such equipment when peak demand capacity limitations dictate a reduction in usage. What is further needed is a control device that logs (e.g. records, tracks, trends) the time, duration and amount of electricity that is "saved" by reducing the operation of such equipment, and provides output data to determine the cost savings provided by the intelligent monitoring, relative to the facility's typical usage pattern. What is further needed is a system that communicates with a power provider to permit a user, such as a power provider, to "trim" or "shed" certain loads during peak demand periods by overriding the demand-based control signals. What is further needed is a system that provides a data log of energy reduction (i.e. total reduction and reduction for individual devices) achieved by use of the system, both on a cumulative basis for a designated period of time, and on an instantaneous basis for confirmation by a power provider.

Accordingly, it would be desirable to provide a system and method that permits an energy user and/or a power provider to actively manage and reduce the energy usage in a facility required by HIF lighting equipment, particularly during periods of peak and off-peak demand.

SUMMARY

In one exemplary embodiment, a method of reducing electricity usage during peak demand periods is provided. The method includes the steps of (a) establishing one or more predetermined load reduction criteria that are representative of a desire by a power provider to reduce loading on an electricity supply grid, and (b) coordinating with a facility having a plurality of HIF lighting equipment to permit the power provider to turn-off one or more of the HIF lighting equipment by sending instructions to a master controller at the facility in response to an occurrence of one or more of the predetermined load reduction criteria, and (c) establishing a list of one or more of the HIF lighting equipment to be turned-off in response to the instructions, and (d) configuring the master controller to send an override control signal to the one or more of the HIF lighting equipment to implement the instructions, and (e) configuring the one or more of the HIF lighting equipment to send a response signal to the master controller providing a status of the HIF lighting equipment.

In another exemplary embodiment, system for monitoring, controlling and metering HIF lighting fixtures in a facility. The system includes at least one sensor operable to measure a parameter within an interior space of the facility and to send a sensor signal representative of the parameter to a master controller. A plurality of local transceiver units communicate with the master controller, where each local transceiver unit is configured for installation on each of the HIF lighting fixtures. The master controller communicates with the sensor and the local transceiver units, and operates to provide a control signal to the local transceiver units to control operation of the HIF lighting fixtures according to a time-based scheme, and process the sensor signal and provide a control signal to control operation of one or more of the HIF lighting fixtures according to a demand-based scheme, and receive and process override instructions and provide an override control signal to control operation of one or more of the HIF lighting fixtures according to an override-based scheme, and receive a signal from the local transceiver units representative of a status of the electrical device associated with the transceiver units, and quantify a reduction in power usage achieved by the demand-based scheme and the override-based scheme, and transmit data representative of the reduction in power usage to a user.

In another exemplary embodiment, a method of method for monitoring, controlling and metering HIF lighting fixtures in a facility is provided. The method includes controlling operation of the HIF lighting fixtures by transmitting a time-based control signal to one or more of the HIF lighting fixtures according to a time-based control scheme, and modifying the time-based control scheme by transmitting a demand-based control signals to one or more of the HIF lighting fixtures, and overriding the time-based control signals and the demand-based control signals by providing an override signal to one or more of the HIF lighting fixtures, and quantifying a reduction in power obtained by controlling the HIF lighting fixtures with any one or more of the time-based control signal, the demand-based signal and the override signal.

In a further exemplary embodiment, a system for monitoring, controlling and metering a plurality of HIF lighting fixtures in a facility is provided. The system includes at least one sensor operable to measure a parameter within an interior space of the facility and to send sensor signals representative of the parameter to a master controller. A plurality of local transceiver units are configured for installation on the plurality of HIF lighting fixtures, where the local transceiver units receive control signals from the master controller to operate an associated HIF lighting fixture and to send response signals to the master controller. The master controller communicates with the sensor and the local transceiver units, and operates to provide a control signal to the local transceiver units to control operation of the HIF lighting fixtures according to a predetermined control schedule, and provide a demand-based control signal to operate the HIF lighting fixtures in response to the sensor signals representative of the parameter, and define actual power reduction data associated with control of the HIF lighting fixtures by the demand-based control signal; and transmit the power reduction data to a user.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

DETAILED DESCRIPTION

Figure 1:
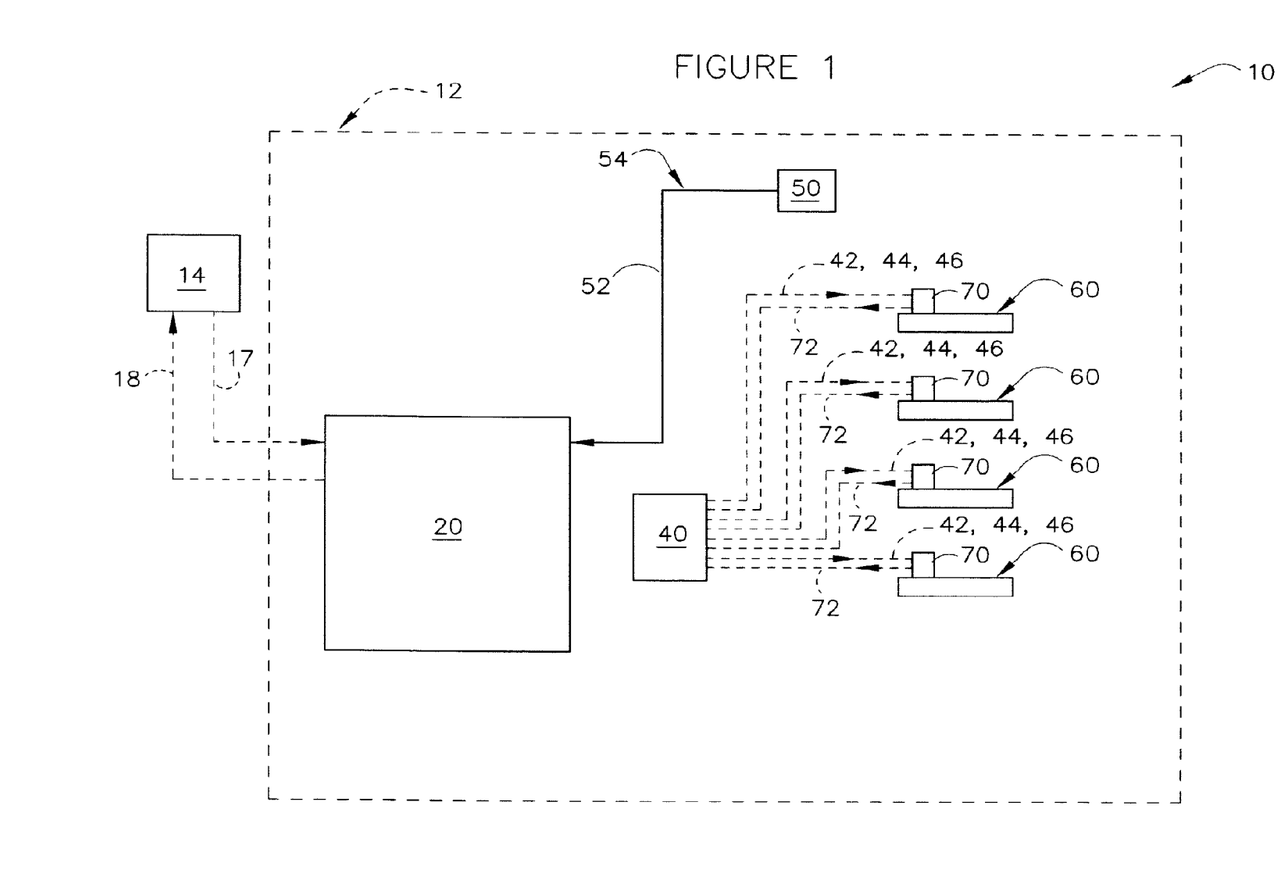
FIG. 1 depicts a schematic diagram of a system for monitoring, controlling and metering a plurality of HIF lighting fixtures in a facility in accordance with an exemplary embodiment.

With reference to FIG. 1, a block diagram of an intelligent system 10 for monitoring, controlling and metering electrically-operated (e.g. electricity consuming) equipment shown as HIF lighting fixtures in a facility 12 is shown in accordance with an exemplary embodiment. The system 10 is shown to include a master controller 20, a master transceiver 40, a sensor 50, a group of HIF lighting fixtures 60, and a local transceiver unit 70 associated with the HIF lighting fixtures 60. Although only one sensor is shown to be associated with the HIF lighting fixtures in one environment (or interior space), it is understood that any number of sensors (operable to monitor any of a wide variety of parameters in one or more interior spaces within the facility) may be provided for operating the HIF lighting fixtures in one or more designated spaces or environments within the facility.

The master controller 20 is programmable with a desired usage pattern (e.g. control schedule, operation schedule, time schedule, etc.) for the applicable electrically-operated equipment in the facility and automatically generates a time-based control signal 42 to be sent from the master transceiver 40 to the local transceiver unit(s) 70 associated with each of the applicable HIF lighting fixtures 60 to control operation of the fixtures according to the usage pattern (e.g. turn on at a specified time, turn off at a specified time, etc.). The master controller 20 is also operable to automatically "learn" a new usage pattern based on an on-going pattern of demand-based control signals 44 from the master controller 20, based on demand signals received from the sensor 50. The master controller may also be manually programmed with new (or modified) usage patterns, as may be determined by a manager of the facility (or other appropriate entity).

In order to provide for intelligent control of the HIF lighting equipment, the master controller 20 is also operable to reduce power consumption during peak and off-peak power demand periods by monitoring the need for operation (e.g. "demand") of the HIF lighting fixtures (as indicated by appropriate signal(s) received from the sensors) and generating a demand-based control signal 44 that is sent from the master transceiver 40 to the local transceiver units 70 for operation of the HIF lighting fixtures 60 in a manner intended to reduce power consumption during the peak and/or off-peak demand periods (e.g. turn-off, turn-on, etc.).

To further provide for intelligent control of the HIF lighting equipment, the master controller 20 may also receive instructions from an external entity (e.g. shown for example as a power provider 14, etc.) to shape or manage peak loading by "trimming" or "shedding" load (e.g. during peak demand periods, or during other periods when power supply capacity is limited, such as when a base load generating plant is taken off-line, etc.) by generating an override control signal 46 to be sent from the master transceiver 40 to the local transceiver units 70 for overriding the time-based control signals 42 and/or the demand-based control signals 44 and turning certain designated HIF lighting fixtures off. According to one embodiment, the override control signal 46 may be selectively transmitted to the fixtures on an as-needed or case-by-case basis to permit selective/manual management of loading and capacity of a power grid during peak demand periods. According to another embodiment, the override control signal 46 may be automatically transmitted to the fixtures upon the occurrence of certain predetermined criteria, such as a reduction in available capacity to a certain level or percentage, or a rate of reduction in available capacity that exceeds a certain setpoint, etc. The criteria for initiation of the override control signal 46 are intended to be established in advance between the power provider and the facility manager and implemented according to a predetermined arrangement. According to such an arrangement, certain designated HIF lighting fixtures may be preprogrammed into the master controller 20 by the facility manager (or others) according to the criticality of operation of the HIF lighting fixtures, and may be provided in "stages" or the like according to an amount of demand reduction that is desired. The local transceiver units actuate the HIF lighting fixtures according to the control signal(s) (i.e. turn-on, turn-off, etc.) and then send a return signal corresponding to the particular HIF lighting fixture to respond to the master controller indicating that the action has been accomplished and to provide a status of each HIF lighting fixture (e.g. on, off, etc.). The term "power provider" as used herein is intended to include (as applicable) any supplier, distributor or aggregator of electrical power to a user, including but not limited to an electric power aggregator, a utility, a utility generator, an electric power generator, an electric power distributor, etc.

The master controller 20 receives the return signal 72 from the local transceiver unit(s) 70 and is intended to provide "intelligent metering" of each of the HIF lighting fixtures 60 in the facility 12 by logging (e.g. tracking, recording, trending, etc.) the power reduction achieved by reducing operation of the HIF lighting fixtures 60 (e.g. during peak demand periods relative to the facility's usage pattern as accomplished by monitoring within the facility 10, or during any reduced capacity period as requested/instructed by the power provider, etc.) and provides data for each HIF lighting fixture to a user (e.g. facility manager, power provider, third-party power reduction service provider, etc.) to confirm the action requested by an override control signal has been accomplished for shaping or managing peak demand, and to quantify the power reduction and/or the corresponding economic savings. The data is provided in a cumulative format to provide a total savings over a predetermined period of time. The data is also provided instantaneously for confirmation of the status of each of the HIF lighting fixtures (e.g. on, off, etc.) by the user.

The master controller 20 may be a custom device that is programmed with the desired algorithms and functionality to monitor and control operation of, and to provide intelligent metering of, the HIF lighting fixtures. Alternatively, the master controller may be a commercially available product.

The master controller 20 is operable in a "normal" mode and an "override" mode for control of the HIF lighting fixtures 60. For "normal" modes of control, the master controller 20 operates according to both a time-based control scheme and a demand-based control scheme to reduce electricity usage during both peak and off-peak demand periods. In the time-based control scheme, the master controller 20 controls operation of the HIF lighting fixtures 60 according to the usage pattern (i.e. on a time-based schedule, etc.) to operate (e.g. energize/de-energize, turn on/off, etc.) the HIF lighting fixtures 60. The usage pattern provides a "baseline" operation control scheme for the HIF lighting fixtures 60 that is time or schedule based, and may be regularly updated (manually or automatically) to reflect changing usage patterns for the HIF lighting fixtures 60. For example, the time based control scheme may reduce off-peak demand by reducing the scope/duration of the usage pattern and conserve energy during evening and nighttime hours.

In the demand-based control scheme, the master controller 20 monitors and controls the designated HIF lighting fixtures 60 within the facility 12 based on signals received from various sensors 50. Each sensor is operable to monitor any one or more of a wide variety of parameters associated within a predefined interior space 16 (e.g. designated environment, room, etc.) within the facility 12, such as but not limited to, ambient light level, motion, temperature, sound, etc., and provide a sensor output signal 52 associated with the parameter to the master controller 20. Alternatively, a switch (e.g. pushbutton, etc.) may be provided so that a user can manually initiate an output signal. The sensor output signal 52 may be transmitted using a network that is wired, or may be wireless. According to one embodiment as shown for example in FIG. 2, the sensor 50 is operable to monitor ambient light level (e.g. through windows, light-pipes, skylights, etc.) and/or motion within the interior space 16 and to provide a sensor output signal 52 to the master controller 20 via a hardwire network 54. The master controller 20 processes the sensor output signal(s) 52 according to a preprogrammed algorithm having logic steps that determine the need (e.g. demand) for operation of the HIF lighting fixtures 60, based on the facility usage pattern and the parameters monitored by the sensor(s) 50, and defines or generates a demand-based control signal 44 to be transmitted from the master transceiver 40 to the appropriate local transceiver unit(s) 70 to control operation of the HIF lighting fixtures 60. For example, the demand based control scheme may reduce peak demand or off-peak demand depending on when the HIF fixtures are turned-off (e.g. by turning-off the HIF fixtures due to ambient light level during daytime hours, or by turning-off the HIF fixtures due to absence of motion during evening/nighttime hours, etc.).

Figure 2:
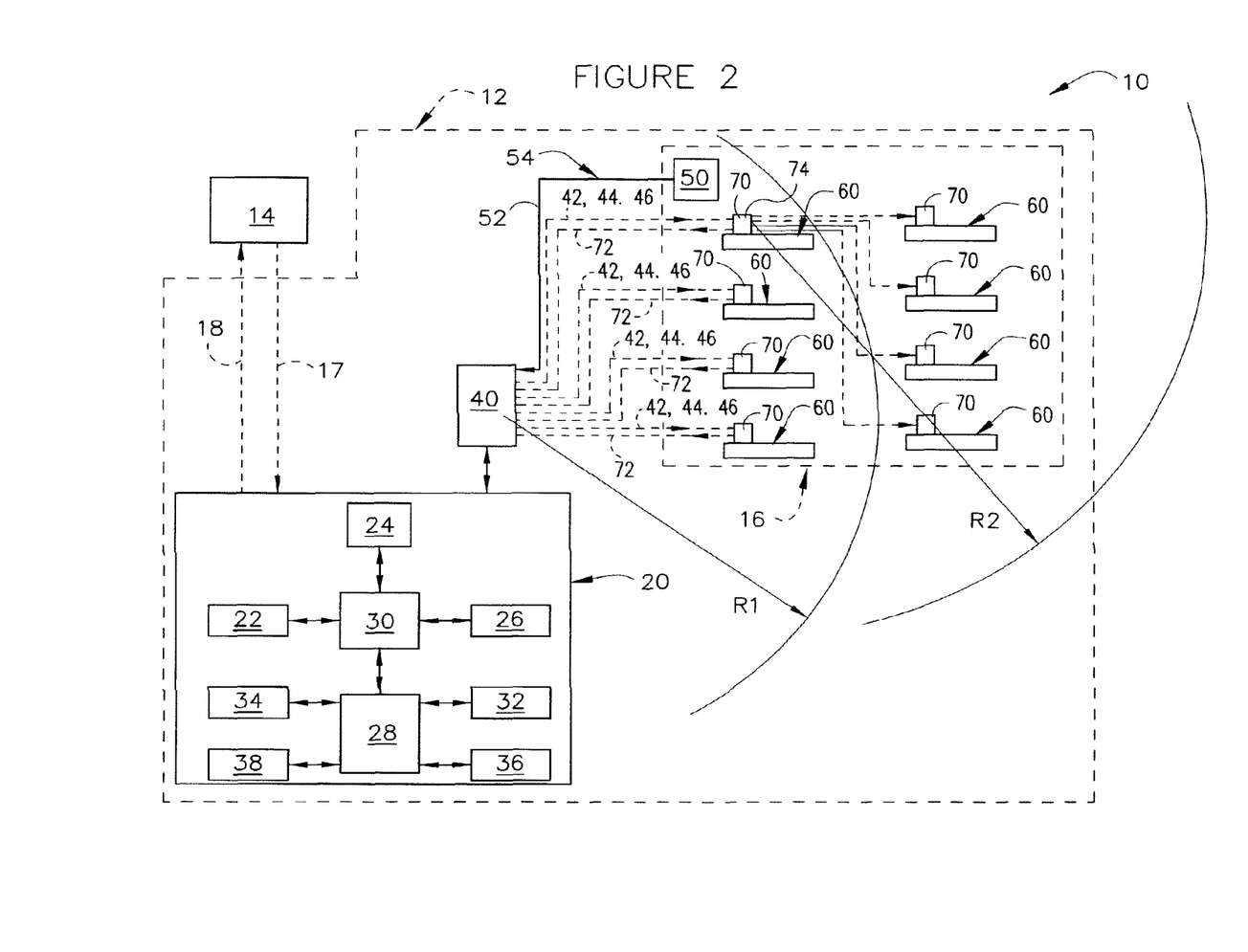
FIG. 2 depicts a schematic diagram of a system for monitoring, controlling and metering a plurality of HIF lighting fixtures in a facility in accordance with another exemplary embodiment.
Figure 3:
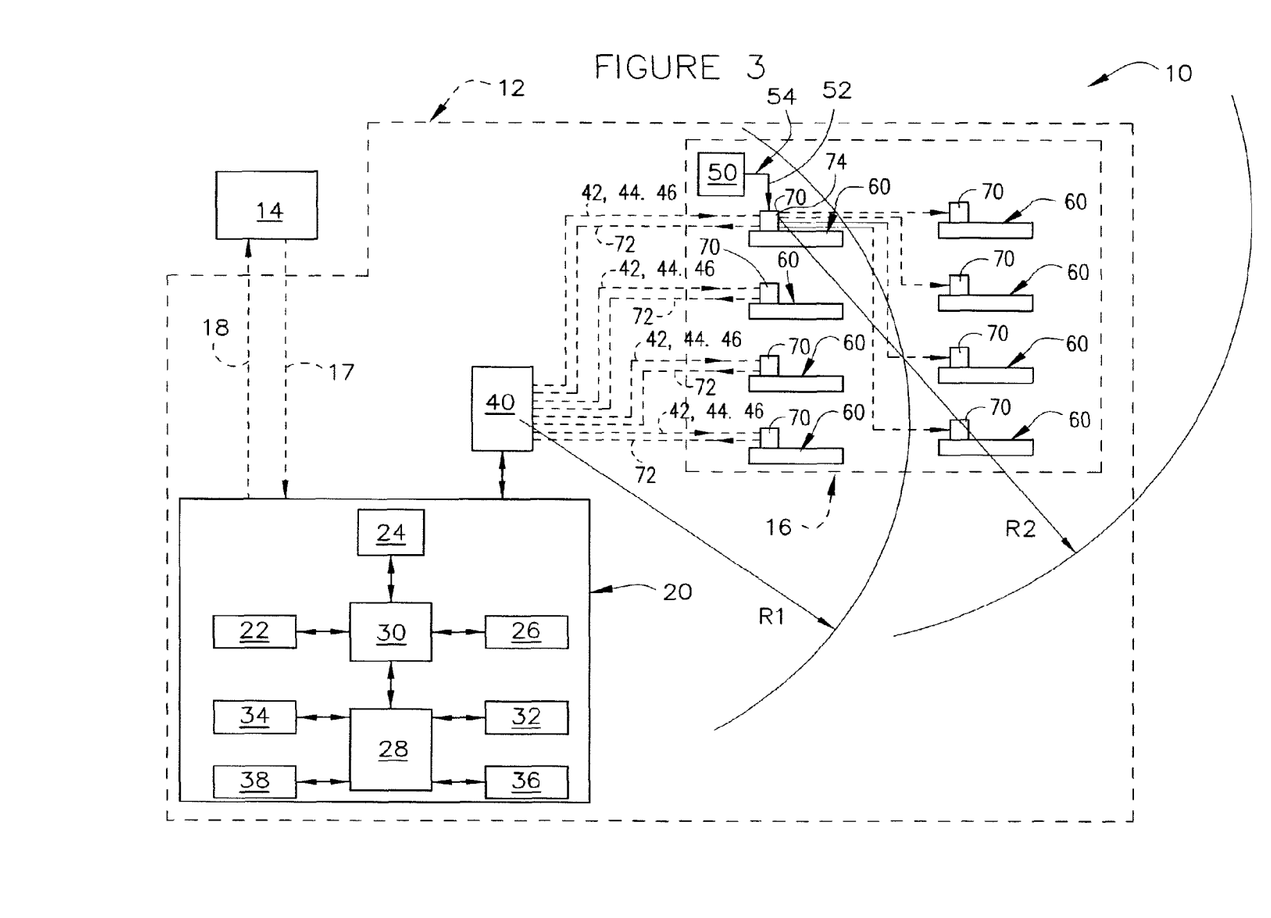
FIG. 3 depicts a schematic diagram of a system for monitoring, controlling and metering a plurality of HIF lighting fixtures in a facility in accordance with a further exemplary embodiment.

According to the embodiment illustrated in FIGS. 1-3, a local transceiver unit 70 is provided on each of the HIF lighting fixtures 60 and intended to be controlled by the master controller 20, and each local transceiver unit 70 includes a unique address corresponding to a particular HIF lighting fixture 60 that is recognized by the master controller 20. According to one embodiment, each local transceiver unit 70 includes multiple switches (e.g. relays, etc.) for operation of the HIF lighting fixtures. For example, in HIF lighting fixtures having two ballasts, one local transceiver unit 70 has two switches and is associated with each fixture, and each ballast (with its associated lamps on the fixture) is independently controlled by one of the switches in the transceiver unit 70. Each local transceiver unit 70 may be coupled to its associated HIF lighting fixture 60 in any one of a variety of manners. For example, the local transceiver unit may be locally installed adjacent to the HIF lighting fixture and hard-wired (e.g. for retro-fit applications, etc.). According to another example, the local transceiver unit may be configured for plug-in connection to the HIF lighting fixtures (e.g. in a "plug-and-play" manner, etc.). According to a further example, the local transceiver unit may be integrally formed with (or otherwise integrally provided as a part or component of) the HIF lighting fixtures.

According to one embodiment as shown for example in FIG. 2-3, the HIF lighting fixtures 60 form an artificial lighting system for interior space 16 in the facility 12. According to an alternative embodiment, the electrical equipment may be any of a wide variety of energy consuming devices or equipment, such as appliances, motors that operate building service loads or run manufacturing process equipment, etc.).

As illustrated in FIGS. 2-3, the master controller 20 receives the sensor output signal 52 representative of motion (e.g. by occupants within the facility, operation of manufacturing equipment, etc.) and/or ambient light level (e.g. artificial light from fixtures that are "on", natural light such as sunlight through windows, skylights, light pipes, etc.) from the sensor(s) 50. The master controller 20 also receives a response signal 72 from the local transceiver unit 70 associated with each HIF lighting fixtures 60 indicating whether the fixture 60 (or it's ballasts) is "on" or "off." The master controller 20 processes the sensor output signal 52 from the sensor 50 and the response signal 72 from local transceiver units 70 according to a preprogrammed method or algorithm and determines whether a demand for lighting exists within the interior space 16, and then provides an appropriate demand-based control signal(s) 44 to the local transceiver unit(s) 70 for operation of the HIF lighting fixtures 60.

For example, the method for determination of artificial lighting demand in the interior space 16 may include the steps of (a) comparing the ambient light level to a predetermined setpoint, below which artificial lighting is desired and above which artificial lighting is not desired, (b) determining whether motion within the environment is present. If the light level is below the setpoint, and the HIF lighting fixtures 60 are "off," and motion is detected, then the master controller 20 generates a demand-based control signal 44 that is transmitted from the master transceiver 40 to the appropriate local transceiver units 70 to turn HIF lighting fixtures 60 (e.g. one or both ballasts) "on". The local transceiver units 70 receive the demand-based control signal 44 and operate to turn their respective HIF lighting fixtures 60 "on" and then send a respond signal 72 to the master controller 20 to provide the status of each HIF lighting fixture 60 (e.g. "on"). Similarly, if the ambient light level within the environment is above the setpoint and the HIF lighting fixtures 60 are "on", regardless whether or not motion is detected, then the master controller 20 provides a demand-based control signal 44 to the local transceiver units 70 to turn fixtures 60 "off". The master controller 20 may delay the control signal for a suitable time delay period (e.g. 5 minutes, 15 minutes, etc.) to provide increased assurance that no activity in the environment is present (e.g. to avoid a "strobe" or "disco" like effect resulting from turning the fixtures on and off in response to intermittently changing light levels—such as intermittent cloud cover, etc.). The master controller 20 may also be programmed to provide a time delay before such fixtures may be turned back on again (e.g. to minimize power consumption associated with too-frequently cycling the equipment or fixtures between and on and off condition, and/or to minimize detrimental effects on the equipment such as reducing lamp life, overheating motors, etc.). The local transceiver units 70 receive the demand-based control signal 44 and operate (e.g. by actuating one or more switches or relays) to turn their respective HIF lighting fixtures 60 "off" and provide a response signal 72 to the master controller 20 indicating the status (e.g. "on" or "off") of the fixture 60, thus providing "metering" of the HIF lighting at a "fixture level."

The master controller 20 "meters" the amount of the power reduction achieved (during peak demand and off-peak demand periods) by logging the response signal 72 of the HIF lighting fixtures' status received from the local transceiver units 70 and providing cumulative data on the time, duration and status of the HIF lighting fixtures 60. The data may be provided on a predetermined frequency (e.g. monthly or keyed on some other criteria, such as a billing period, etc.).

According to an alternative embodiment shown in FIG. 3, the sensor 50 for a particular environment may interface directly with one of the local transceiver units 70 for the HIF lighting fixtures 60 associated with the interior space 16. The local transceiver unit 70 then wirelessly transmits the sensor output signal 52 from the sensor(s) 50 to the master controller 20. For example, a sensor may include a modular quick-connect that plugs into a local transceiver unit, or may be hard-wired to the local transceiver unit, or may transmit the sensor signal wirelessly to the local transceiver unit. In either case, the local transceiver unit "relays" the sensor signal to the master controller.

The master controller also operates to accomplish peak demand energy reduction by receiving override control signals (e.g. to turn-off certain fixtures according to a predetermined scheme) from the power provider (in response to peak demand management or shaping objectives/criteria) and transmitting a signal to appropriate local transceivers to "override" any existing or previous signal and turn-off the associated HIF fixture (or a ballast of the fixture). For such "override" modes of operation where the master controller 20 provides a signal that overrides the "normal" mode of monitoring and controlling operation of the HIF lighting fixtures 60, such as when override control instructions are received from a user (e.g. power provider 14, a facility manager, or the like to shed or trim loads to manage electricity usage during peak demand periods, etc.), the master controller 20 receives input signals or instructions 17 (manually or automatically) to control operation of the HIF lighting fixtures 60. For example, during periods when available electric capacity is limited and a power provider 14 (e.g. an independent system operator, etc.) desires to selectively reduce system-wide loading to maintain stability of a regional electric grid, the power provider may manually send instructions 17 to the master controller 20 to reduce power consumption by a specified amount (e.g. percent load, specific number of kilowatts, etc.). According to another embodiment for managing electricity usage during peak demand periods, the instructions 17 may be provided automatically (e.g. by a automatically initiated and signal sent to the master controller) in response to certain predetermined conditions, occurrences, or criteria (e.g. existing demand is approaching (or has exceeded) a predetermined level such as a percentage of grid capacity, or a rate of increase of demand is approaching (or has exceeded) as a predetermined level, or a loss of certain generating capacity has occurred or is anticipated, etc.), and are received by the master controller 20 to implement the instructions and "override" existing equipment control status (if necessary). The master controller 20 processes the instructions 17 according to a preprogrammed algorithm that reflects the criteria established and agreed upon between the power provider and the facility manager for intervention (or interruption) by the power provider. According to another embodiment, the override control signal 46 may be manually initiated by the facility manager (e.g. by actuating an input interface (touch screen, pushbutton, etc.) at, or operably associated with, the master controller) to permit the facility manager to initiate action (unilaterally or in coordination with a power provider) to reduce peak demand.

According to one embodiment, the algorithm reads the desired load reduction instructed by the power provider 14 and identifies certain HIF lighting fixtures 60 to be turned-off according to a preprogrammed hierarchy of fixtures that are arranged generally from least-critical to most-critical for the operation or purpose of the facility 12, corresponding to the amount of load reduction requested by the power provider 14. The master controller 20 defines or provides an override signal 46 to be transmitted by the master transceiver 40 to the appropriate local transceiver units 70 to turn off the corresponding HIF lighting fixtures 60 identified by the master controller 20 to comply with the instructions 17. The local transceiver units 70 operate to turn the HIF lighting fixtures 60 off and then send a response signal 72 to the master controller 20 with the status of the HIF lighting fixtures 60 (i.e. "off"). The master controller 20 may process one or more iterations of load shedding control signals to local transceiver units 70 until the amount of load reduction requested by the power provider 14 has been achieved. The master controller 20 logs the status of the HIF lighting fixtures 60 and sends data 18 (e.g. "instantaneously" or otherwise within a certain desired time period) to the power provider 14 confirming the instructions and identifying the equipment status and the corresponding amount of power reduction (i.e. "instantaneous metering" or the like), where the dynamics of regional grid stability and control dictate a rapid instruction and response.

Upon restoration of the system condition (e.g. grid stability, desired capacity margins, etc.) the power provider 14 may then send instructions 17 to the master controller to resume a normal mode of operation for the HIF lighting fixtures 60 (as otherwise indicated by time-based or demand-based criteria). Alternatively, in the event that override operation was initiated within the facility (e.g. by a facility manager, etc.), the facility manager may provide instructions to the master controller (e.g. via an input interface on the master controller, etc). The master controller 20 then operates to restore such loads (if needed) according to the algorithm for the normal mode of operation, including such factors as the facility's usage pattern, the sensor signals, the existing status of the HIF lighting fixtures, etc., preferably by restoring the HIF lighting fixtures in order from most-critical to least-critical.

During any mode of operation, the master controller 20 monitors the status of the HIF lighting fixtures 60 and records the time (e.g. date and time) that the devices turn on and off, and determines the amount of time that the device was actually "off" during the normal "on" time of the facility's usage pattern and calculates the amount of peak demand electrical energy saved, based on pre-programmed data related to each fixture's electrical power consumption rating. The calculation of peak demand electrical energy saved may be conducted on a daily basis, or may be done on a less frequent and cumulative basis (e.g., weekly, monthly, etc.).

According to one embodiment, the master controller 20 also sends the data 18 representing the peak demand power reduction to the facility's power provider 14, so that an appropriate credit for reduction in peak demand power may be received by the facility owner (or its representative). The applicants believe that large-scale implementation of the intelligent monitoring, controlling and metering system and the "override" ability to shed a facility's loads when necessary in a predetermined manner could provide substantial reductions in peak power demand, and permit the power provider to better manage limited power resources during peak periods. Such peak demand reductions are intended to minimize the need for constructing new power generating plants, which could provide substantial economic savings/benefit. However, in order for demand-side users of the power to implement peak demand power consumption reduction measures such as intelligent monitoring and metering, business models typically require some type of incentive to be provided to the user. One possibility is that the power provider could provide certain on-going credits (e.g. discounts, rebates, refunds, etc.) corresponding to the peak demand power reduction achieved by the user, in order to provide incentive. The master controller is intended to allow demand-side users to intelligently manage their power usage and obtain corresponding credits, while permitting the supply-side power providers to obtain the benefits of a lower peak demand, by actively controlling operation of the electrically-operated equipment, and recording and storing the equipment's operating status data, and calculating the resulting reduction in peak power demand, and transmitting such data to the power provider.

Referring further to FIG. 2, the master controller 20 is described in further detail, according to an exemplary embodiment. Master controller 20 is shown to include a display 22, an input interface 24, an output interface 26, a memory 28, a processor 30, a normal mode equipment controller application 32, an override mode equipment control application 34, a power reduction metering application 36 and a usage pattern application 38. However, different and additional components may be incorporated into master controller. Display 22 presents information to a user of master controller 20 as known to those skilled in the art. For example, display 22 may be a thin film transistor display, a light emitting diode display, a liquid crystal display, or any of a variety of different displays known to those skilled in the art now or in the future.

Input interface 24 provides an interface for receiving information from the user for entry into master controller 20 as known to those skilled in the art. Input interface 24 may use various input technologies including, but not limited to, a keypad, a keyboard, a pen and touch screen, a mouse, a track ball, a touch screen, one or more buttons, a rotary dial, etc. to allow the user to enter information into master controller 20 or to make selections presented in a user interface displayed on display 22. Input interface 24 is also configured to receive signals from a power provider 14 (e.g. override instructions to reduce load, etc.). Input interface 24 is also configured to receive response signals 72 from the local transceiver units 70 representative of a status of their associated HIF lighting fixtures 60. Output interface 26 provides the control signals to the master transceiver 40, and sends metering data 18 to a user (e.g. transmits instantaneous monitoring and metering data to a power provider 14 in response to override instructions, or transmits power reduction metering data for a predetermined period of time to the power provider 14, etc.). According to other embodiments, the input interface 24 may provide both an input and an output interface. For example, a touch screen both allows user input and presents output to the user. Master controller 20 may have one or more input interfaces and/or output interfaces that use the same or a different technology.

Memory 28 is an electronic holding place or storage for information so that the information can be accessed by processor 30 as known to those skilled in the art. Master controller 20 may have one or more memories that use the same or a different memory technology. Memory technologies include, but are not limited to, any type of RAM, any type of ROM, any type of flash memory, etc. Master controller 20 also may have one or more drives that support the loading of a memory media such as a compact disk, digital video disk, or a flash stick.

Master transceiver 40 provides an interface for receiving and transmitting data between devices (e.g. master controller 50, sensors 50, local transceiver units 70, etc.) using various protocols, transmission technologies, and media as known to those skilled in the art. The communication interface may support communication using various transmission media that may be wired or wireless. Master controller 20 may include a plurality of communication interfaces that use the same or a different transmission and receiving technology.

Processor 30 executes instructions as known to those skilled in the art. The instructions may be carried out by a special purpose computer, logic circuits, or hardware circuits. Thus, processor 30 may be implemented in hardware, firmware, software, or any combination of these methods. The term "execution" is the process of running an application or the carrying out of the operation called for by an instruction or algorithm. The instructions or algorithm may be written using one or more programming language, scripting language, assembly language, etc. Processor 30 executes an instruction, meaning that it performs the operations called for by that instruction. Processor 30 operably couples with display 22, with input interface 24, with output interface 26, and with memory 28 to receive, to send, and to process information. Processor 30 may retrieve a set of instructions from a permanent memory device and copy the instructions in an executable form to a temporary memory device that is generally some form of RAM. Master controller 20 may include a plurality of processors that use the same or a different processing technology.

Normal mode equipment controller application 32 performs operations associated with managing electricity usage during peak demand and off-peak demand periods by controlling the operation of HIF lighting fixtures 60 in the facility 12 (such as a light level within the interior space 16). Control of the HIF lighting fixtures 60 may be determined according to a time-based control algorithm (e.g. based on a usage pattern) and a demand-based control algorithm (e.g. based on input signals from sensor(s) that monitor applicable parameters or conditions such as light level and motion). The operations may be implemented using hardware, firmware, software, or any combination of these methods. With reference to the exemplary embodiment of FIG. 2, normal mode equipment controller application 32 is implemented in software stored in memory 28 and accessible by processor 30 for execution of the instructions that embody the operations of normal mode equipment controller application 32. Normal mode equipment controller application 32 may be written using one or more programming languages, assembly languages, scripting languages, etc.

Override mode equipment controller application 34 performs operations associated with reducing electricity usage during peak demand periods by overriding the normal operation of HIF lighting fixtures 60 in the facility 12 (such as reducing or shedding loads in the facility 12 in response to instructions 17 generated automatically or manually and received from a power provider 14, or the facility manager, etc.). The operations may be implemented using hardware, firmware, software, or any combination of these methods. With reference to the exemplary embodiment of FIG. 2, override mode equipment controller application 34 is implemented in software stored in memory 28 and accessible by processor 30 for execution of the instructions that embody the operations of override mode equipment controller application 34. Override mode equipment controller application 34 may be written using one or more programming languages, assembly languages, scripting languages, etc.

Power reduction metering application 36 performs operations associated with calculating the amount of electric power saved during peak and off-peak demand periods by controlling the usage of the HIF lighting fixtures 60 within the facility 12. The operations may be implemented using hardware, firmware, software, or any combination of these methods. With reference to the exemplary embodiment of FIG. 2, power reduction metering application 36 is implemented in software stored in memory 28 and accessible by processor 30 for execution of the instructions that embody the operations of power reduction metering application 36. Power reduction metering application 36 may be written using one or more programming languages, assembly languages, scripting languages, etc.

Facility usage pattern application 38 performs operations associated with establishing or providing the normal usage pattern (e.g. time schedule and status such as "on" or "off") of the HIF lighting fixtures 60 in the facility 12, for use in calculating the amount of electric power saved during peak and off-peak demand periods by controlling the usage of the HIF lighting fixtures 60 within the facility 12. According to one embodiment, the facility usage pattern application 38 also includes power consumption ratings for the HIF lighting fixtures 60 controlled by the master controller 20. The operations may be implemented using hardware, firmware, software, or any combination of these methods. With reference to the exemplary embodiment of FIG. 2, facility usage pattern application 38 is implemented in software stored in memory 28 and accessible by processor 30 for execution of the instructions that embody the operations of peak demand power saved application 38. Peak demand power saved application 38 may be written using one or more programming languages, assembly languages, scripting languages, etc.

Referring further to FIG. 2, the HIF lighting fixtures 60 may be the same or may include variations of HIF lighting devices. Associated with each of the plurality of HIF lighting fixtures 62 is a local transceiver 70 having a unique address recognized by the master controller 20, and which receives and responds to a control signal (42, 44, 46) from master transceiver 40. The control signal (42, 44, 46) may include a lighting indicator specific to each of the plurality of HIF lighting fixtures 60 or may include the same lighting indicator for each of the plurality of HIF lighting fixtures 60. The lighting indicator may indicate on/off or may indicate a lighting level (e.g. turn one or both ballasts of a fluorescent lighting fixture on or off).

According to one embodiment, the local transceiver units 70 are capable of plugging into the lighting fixtures (or other electrically operated equipment provided by any of a wide variety of manufacturers) without additional wiring and can communicate (e.g. receive and respond) wirelessly with the master controller 20 using radio frequency (e.g. 915 MHz).

Each local transceiver unit is assigned a unique address, so that each fixture is identifiable to (and controllable by) the master controller 20.

According to one embodiment, master transceiver 40 transmits control signal 42, 44, 46 using a radio frequency (such as 915 MHz) to the local transceiver units 70 of the interior space 16 that are within an effective range R1 defined based on the characteristics of the transmitter as known to those skilled in the art. However any of a wide variety of operating frequencies, modulation schemes, and transmission power levels can be used. For example, frequencies in the range of 27-930 MHz, and particularly within about 5% of 315, 434, 868, and/or 915 MHz may be used. Additionally, other frequencies such as 2.4 gigahertz may be used. Master transceiver 40 and local transceiver units 70 may be designed to qualify as unlicensed radio frequency devices under the Federal Communications Commission rules found in 47 C.F.R. §15. Master controller 20 is configured to encode a particular transceiver address in the control signal 42, 44, 46. Each local transceiver unit 70 is configured to respond only to control signals 42, 44, 46 encoded with its unique address. The HIF lighting fixture 60 associated with each local transceiver unit 70 can be turned on or off (or dimmed by de-energizing only one ballast) based on the control signal 42, 44, 46 received from the master transceiver 40. The address information may be encoded in the control signal using a variety of methods as known to those skilled in the art.

Referring further to FIG. 2, the master controller 20 can control the HIF lighting fixtures 60 located throughout the facility 12, by using one or more of the local transceiver units 70 as "repeaters" (shown as a repeater 74) to overcome range limitations due to the distance of the desired equipment from the master transceiver 40. For example, master transceiver 40 transmits a control signal 42, 44, 46 within a first range R1 for operation of fixtures 60 that are within range R1. A local transceiver unit 70 positioned within effective range R1 is designated (i.e. preprogrammed) to also operate as a repeater 74 by receiving the signal 42, 44, 46 from master transceiver 40 and retransmitting the control signal 42, 44, 46 using a radio frequency (e.g. 915 MHz) to any local transceiver units 70 within a repeater effective range R2. Using the local transceiver unit 70 as a repeater 74, the group of equipment 60 (shown for example as light fixtures 62) positioned outside effective range R1 (and within the effective range R2) can be controlled. Although only one repeater has been shown, multiple repeaters may be provided to permit control of a wide variety of electrically operated equipment located in various interior spaces throughout the facility.

Figure 4:
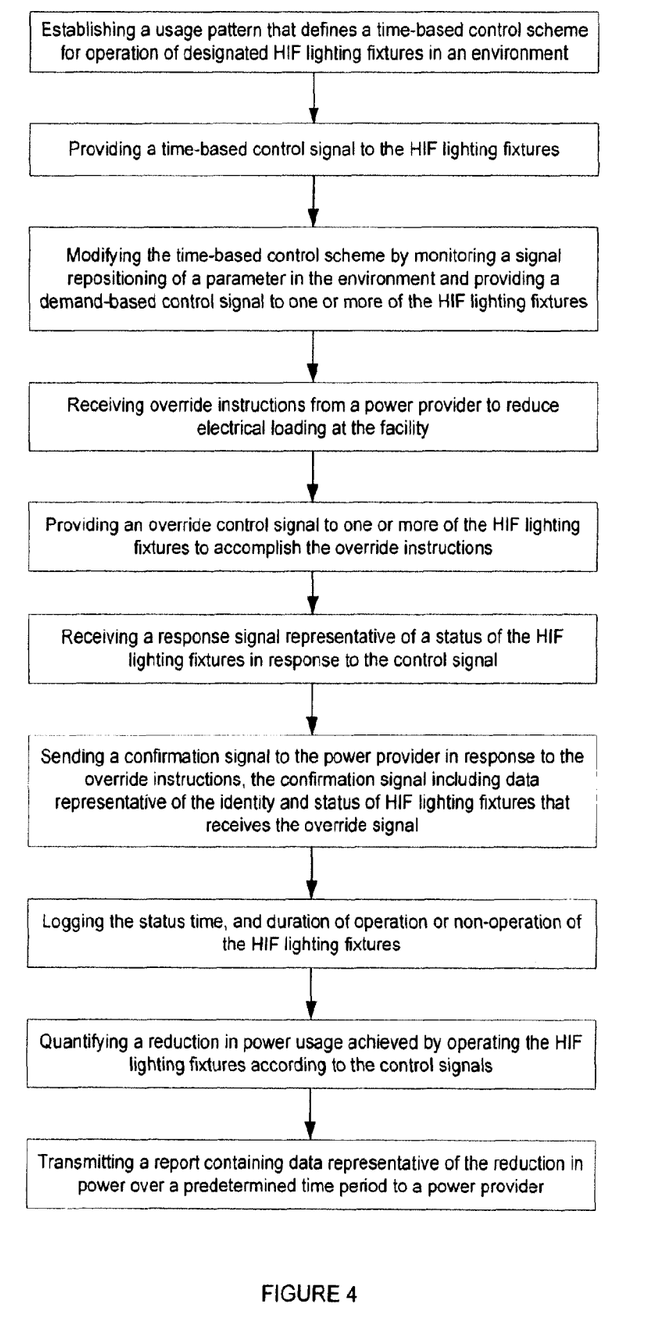
FIG. 4 depicts a block diagram of a method for monitoring, controlling and metering a plurality of HIF lighting fixtures in a facility in accordance with an exemplary embodiment.

Referring to FIG. 4, the method of monitoring, controlling and metering the HIF lighting fixtures in the facility is shown according to one embodiment to include the following steps (among possible other steps):

(a) establishing a usage pattern that defines a time-based control scheme for operation of designated HIF lighting fixtures within an environment of a facility, (b) providing a time-based control signal to the HIF lighting fixtures to operate according to the time-based control scheme, (c) modifying the time-based control scheme by monitoring a signal representative of one or more parameter in the environment and providing a demand-based control signal to one or more of the HIF lighting fixtures, (d) receiving override instructions from a power provider to reduce electrical loading at the facility, (e) providing an override control signal to one or more of the HIF lighting fixtures to accomplish the override instructions, (f) receiving a response signal representative of a status of each of the HIF lighting fixtures in response to the control signals, (g) sending a confirmation signal to the power provider in response to the override instructions, the confirmation signal including data representative of the identity and status of the HIF lighting fixtures that received the override control signal, (h) logging the status, time and duration of operation (or non-operation) of each of the HIF lighting fixtures, (i) quantifying a reduction in the power usage achieved by operating the HIF lighting fixtures according to the control signals, and (j) sending a report containing data representative of the reduction in power usage over a predetermined time period to a power provider.

However, any one or more of a variety of other steps may be included, in any particular order to accomplish the method of monitoring, controlling and metering operation of the HIF lighting fixtures in the facility.

Figure 5:
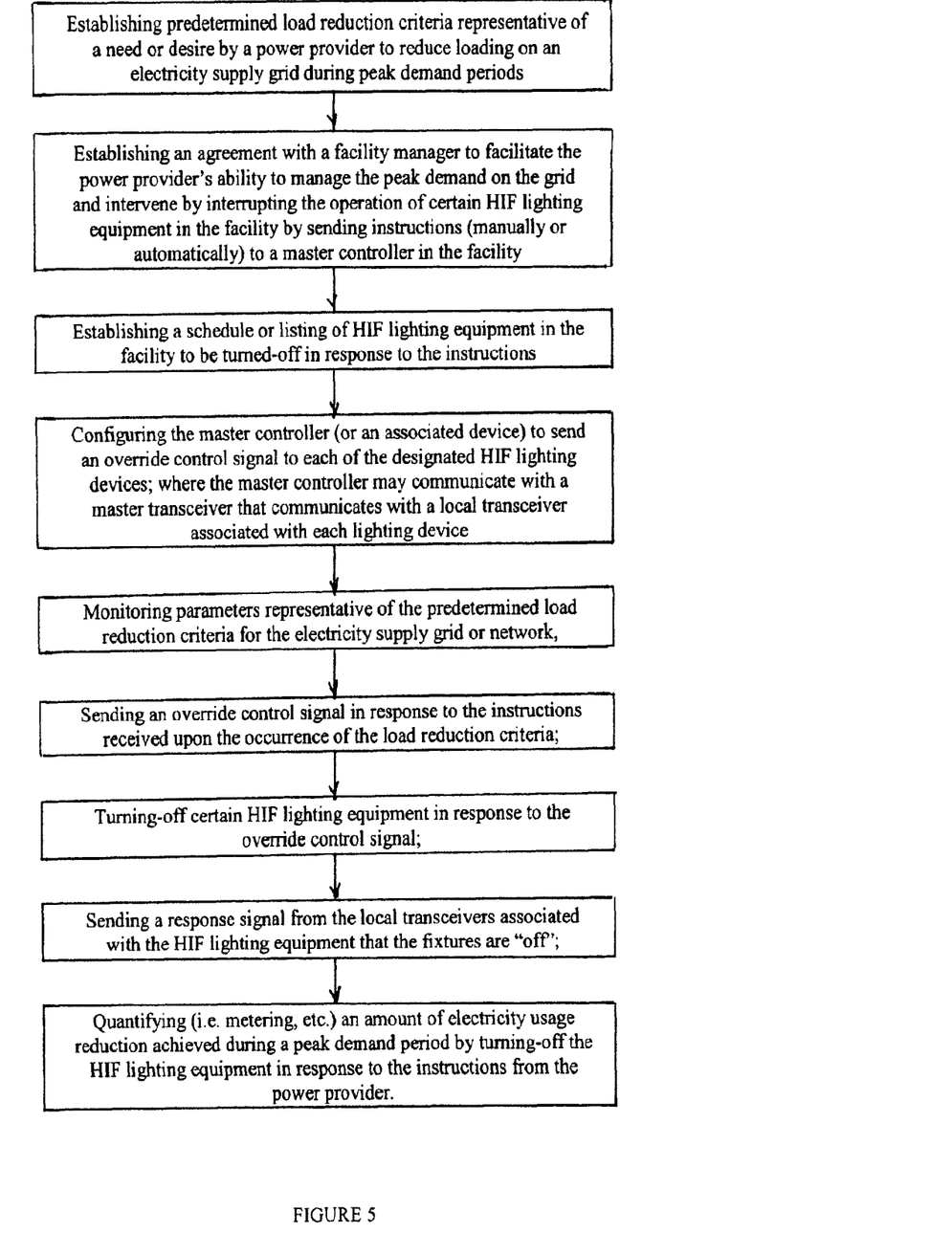
FIG. 5 depicts a block diagram of a method for reducing electricity usage during peak demand periods in accordance with an exemplary embodiment.

Referring to FIG. 5, the method of reducing electricity usage during peak demand periods by monitoring, controlling and metering the HIF lighting fixtures in the facility is shown according to one embodiment to include the following steps (among possible other steps):

(a) establishing a set of predetermined load reduction criteria that are representative of a need or desire by a power provider to reduce loading on an electricity supply grid during peak demand periods; the criteria may include a level or amount of load/demand on the grid, or a rate of increase in load/demand on the grid, or an actual or anticipated reduction in electricity supply to the grid, or a level or amount of capacity available on the grid, or a rate of decrease in the capacity available on the grid, where capacity is generally understood to be the difference between the available supply of electricity to the grid and the demand (i.e. load, etc.) on the grid (e.g. by users connected to the grid, etc.), (b) establishing an agreement with a facility manager to facilitate the power provider's ability to manage the peak demand on the grid and intervene by interrupting the operation of certain HIF lighting equipment in the facility by sending instructions (manually or automatically) to a master controller in the facility; the instructions may designate specific equipment to be turned-off, or may specify an amount of electricity usage reduction to be achieved at the facility; the instructions may be initiated manually on an as-needed basis, or the may be initiated automatically in response to the occurrence of one or more of the predetermined load reduction criteria; where the instructions may identify specific HIF lighting equipment to be turned-off (e.g. according to a unique address for a local transceiver associated with the specific HIF lighting equipment), or specify an amount of load reduction requested by the power provider, (c) establishing a schedule or listing of HIF lighting equipment in the facility to be turned-off in response to the instructions; the listing of equipment may be include individual fixtures, or independent ballasts within a fixture, identified by a unique address recognized by the master controller; the fixtures may be groups of fixtures based on location or criticality to operation of the facility; the groups of fixtures may be specified in a cascading hierarchy of groups that are turned-off sequentially, or simultaneously, depending on an amount of electricity usage reduction, or the specific fixtures/ballasts, identified by the instructions;

(d) configuring the master controller (or an associated device) to send an override control signal to each of the designated HIF lighting devices; where the master controller may communicate with a master transceiver that communicates with a local transceiver associated with each lighting device (or a designated group of lighting devices to be operated collectively as a single unit), (e) monitoring a status of the capacity of, or demand on, an electricity supply grid or network, (f) sending an override control signal in response to the instructions received upon the occurrence of any one or more of the predetermined load reduction criteria;

(g) turning-off certain HIF lighting equipment in response to the override control signal;

(h) sending a response signal from the local transceivers associated with the HIF lighting equipment confirming that the fixtures are "off";

(i) quantifying (i.e. metering, etc.) an amount of electricity usage reduction achieved during a peak demand period by turning-off the HIF lighting equipment in response to the instructions from the power provider.

According to any exemplary embodiment, a system and method are provided for reducing electricity usage during peak and off-peak demand periods through intelligent monitoring, control and metering of HIF lighting fixtures within a facility. The system includes a master controller, a master transceiver, one or more sensors, and a local transceiver unit uniquely identifiable to the master controller for each of the HIF lighting fixtures in the facility to be controlled. The sensor(s) monitor parameters within the facility and provide sensor signal(s) representative of the parameters to the master controller. During a normal mode of operation, the master controller processes the sensor signals according to preprogrammed algorithms and define or generate signals that are transmitted from the master transceiver to the appropriate local transceiver unit(s) to control operation of the HIF lighting fixtures. The local transceiver units provide a response signal to the master controller indicating the status of the associated HIF lighting fixtures for logging and tracking by the master controller. The master controller provides power reduction metering data to a user for quantifying the power saved and the economic benefit resulting from the power saved. During an override mode of operation, an outside user (e.g. power provider, facility manager, etc.) may manage the peak demand on the electric grid by providing instructions (manually or automatically) to reduce or shed load at the facility. The instructions may be generic (e.g. reduce power by a certain amount or percentage) or the instructions may be directed to certain identified equipment. The master controller processes the instructions according to preprogrammed algorithms and defines or generates signals that override previous control signals and are transmitted from the master transceiver to the appropriate local transceiver unit(s) to provide override control operation of the HIF lighting fixtures. The local transceiver units provide a response signal to the master controller indicating the status of the associated HIF lighting fixtures for logging and tracking by the master controller. The master controller provides instantaneous metering data to the power provider to confirm implementation of the instructions and identify a corresponding economic benefit resulting from the power saved. According to alternative embodiments, the system and method described herein may be adapted for use with other types of electrically operated equipment within the facility, such as equipment related to manufacturing processes, building support and services, and the like.

Accordingly, the intelligent monitoring, controlling and metering of the HIF lighting equipment in a facility is provided by the master controller and includes preprogrammed instructions, algorithms, data and other information that permits the HIF lighting equipment to be controlled (e.g. turned-off) in response to commands from an external source (e.g. a power provider), or an internal source (e.g. a facility manager), or in response to signals received from suitable sensors, to provide optimum operation of the HIF lighting equipment in coordination with peak-demand conditions, and to reduce overall energy usage and impact on the environment, and to optimize performance and life of the HIF lighting equipment and reduce maintenance and costs associated with the lighting equipment.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed herein.

What is claimed is:

1. A method for metering energy use in a facility having a plurality of lighting fixtures, comprising:
    determining, using a sensor coupled to control circuitry local to a first lighting fixture, whether an ambient light level near the first lighting fixture exceeds a predetermined setpoint;
    in response to determining that the ambient light level near the first lighting fixture exceeds the predetermined setpoint, wirelessly transmitting an override signal from a first lighting fixture to a first group of lighting fixtures within a first transmission range, wherein the override signal is configured to cause one or more of the first group of lighting fixtures to enter into an off state;
    receiving the override signal at the first group of lighting fixtures;
    wirelessly retransmitting the override signal directly from one or more of the first group of lighting fixtures to a second group of lighting fixtures within a second transmission range, wherein the second transmission range is outside of the transmission range of the first lighting fixture, wherein the override signal is not passed through a gateway that is not a lighting fixture to be retransmitted from the first group of lighting fixtures to the second group of lighting fixtures, and wherein the override signal retransmitted from the one or more of the first group of lighting fixtures to the second group of lighting fixtures is configured to cause one or more of the second group of lighting fixtures to enter into an off state;
    receiving the retransmitted override signal at the second group of lighting fixtures and, in response to the retransmitted override signal: (a) conducting an override at the second group of lighting fixtures and (b) reporting a status update from each of the second group of lighting fixtures to a master controller via at least one retransmission by one or more of the first group of lighting fixtures; and metering lighting system energy usage using at least the status information from the second group of lighting fixtures retransmitted to the master controller by the one or more of the first group of lighting fixtures.

2. The method of claim 1, wherein metering lighting system energy usage comprises:

monitoring the status of the plurality of lighting fixtures by recording times that each lighting fixture transitions from on to off and from off to on.

3. The method of claim 2, wherein metering lighting system energy usage further comprises:

determining an amount of time that each lighting fixture was actually off during a normally scheduled on time due to the override signal.

4. The method of claim 3, wherein the metering does not include using energy metering devices on power lines of the lighting system.

5. The method of claim 3, wherein metering lighting system energy usage further comprises:

calculating the amount of energy saved based on each lighting fixture's electrical power consumption rating applied over the amount of time that each lighting fixture was actually off during a normally scheduled on time due to the override signal.

6. The method of claim 5, further comprising, at the master controller:

using the recorded times to controllably cause a time delay to elapse before a lighting fixture of the plurality of lighting fixtures is cycled on again after it has been turned off.

7. The method of claim 1, further comprising:

wherein at least one lighting fixture of the first group of lighting fixtures and the second group of lighting fixtures retransmits the override signal to a master controller.

8. The method of claim 1, further comprising:

generating, using a motion sensor, a motion signal representative of whether motion has been detected proximate to at least one of the first group of lighting fixtures and the second group of lighting fixtures; and determining whether to place one or more lighting fixtures of at least one of the first group of lighting fixtures and the second group of lighting fixtures in the off state or in an on state based on the override signal and the motion signal.

9. A system for metering energy use in a facility having a plurality of lighting fixtures, comprising:

a master controller;
a first group of lighting fixtures;
a first lighting fixture configured to wirelessly transmit an override signal to the first group of lighting fixtures within a wireless transmission range of the first lighting fixture;
a second group of lighting fixtures outside the wireless transmission range of the first lighting fixture; and
a sensor coupled to control circuitry local to the first lighting fixture and configured to sense an ambient light level near the first lighting fixture;
wherein at least one of the sensor and the first lighting fixture is configured to determine whether the ambient light level exceeds a predetermined setpoint;

wherein the first lighting fixture is configured to wirelessly transmit the override signal to the first group of lighting fixtures in response to determining that the ambient light level near the first lighting fixture exceeds the predetermined setpoint, wherein the override signal is configured to cause one or more of the first group of lighting fixtures to enter into an off state;

wherein one or more lighting fixtures of the first group of lighting fixtures are configured to directly retransmit the override signal received from the first lighting fixture to the second group of lighting fixtures;

wherein the second group of lighting fixtures are configured to, in response to receiving the retransmitted override signal, conduct an override of normal operation and report a status update to the master controller via at least one retransmission by one or more of the first group of lighting fixtures, wherein the override signal is configured to cause one or more of the second group of lighting fixtures to enter into an off state;

wherein the master controller is configured to meter lighting system energy usage using at least the status information from the second group of lighting fixtures retransmitted to the master controller by the one or more lighting fixtures of the first group of lighting fixtures.

10. The system of claim 9, wherein the master controller meters lighting system energy without using energy metering devices on power lines of the lighting system.

11. The system of claim 9, wherein the master controller is configured to monitor the status of the plurality of lighting fixtures by recording the times that each lighting fixture transitions from on to off and from off to on.

12. The system of claim 11, wherein the master controller is further configured to determine an amount of time that each lighting fixture was actually off during a normally scheduled on time due to the override signal.

13. The system of claim 12, wherein the master controller is configured to calculate the amount of energy saved based on each lighting fixture's electrical power consumption rating applied over the amount of time that each lighting fixture was actually off during a normally scheduled on time due to the override signal.

14. The system of claim 13, wherein the master controller is further configured to use the recorded times to controllably cause a time delay to elapse before a lighting fixture of the plurality of lighting fixtures is cycled on again after it has been turned off.

15. A master controller for a lighting system having a plurality of lighting fixtures, comprising:

memory comprising a database of individual light on and off transition times for each of the plurality of lighting fixtures;
a wireless transceiver; and
a processing circuit coupled to the wireless transceiver and the memory;
wherein the processing circuit is configured to determine, using a sensor communicatively coupled to the master controller, whether an ambient light level exceeds a predetermined setpoint;
wherein the processing circuit is configured to wirelessly transmit an override signal to a first group of lighting fixtures of the plurality of lighting fixtures within a first transmission range in response to determining that the ambient light level exceeds the predetermined setpoint, wherein the override signal is configured to cause one or more of the first group of lighting fixtures to enter into an off state;

wherein the override signal is configured to cause one or more of the first group of lighting fixtures to wirelessly retransmit the override signal directly to a second group of lighting fixtures of the plurality of lighting fixtures within a second transmission range, wherein the second transmission range is outside of the transmission range of the first lighting fixture, wherein the override signal is not passed through a gateway that is not a lighting fixture to be retransmitted from the first group of lighting fixtures to the second group of lighting fixtures, and wherein the override signal is configured to cause one or more of the second group of lighting fixtures to enter into an off state;

wherein the processing circuit is configured to receive status updates at the wireless transceiver from the plurality of lighting fixtures and wherein the processing circuit is configured to use the database of individual on and off transition times for each of the plurality of lighting fixtures to calculate an amount of energy saved based on each lighting fixture's electrical power consumption rating applied over the amount of time that each lighting fixture was actually off during a normally scheduled on time due to the override signal, wherein the master controller calculates the amount of energy saved without using energy metering devices on power lines of the lighting system.

16. The master controller of claim 15, wherein the master controller is configured to use the database of individual light on and off transition times for each of the plurality of lighting fixtures to controllably cause a time delay to elapse before a lighting fixture of the plurality of lighting fixtures is cycled on again after it has been turned off.

17. The master controller of claim 15, further comprising:
a wire interface for receiving an ambient light signal from the sensor, wherein the processing circuit is configured to use the ambient light signal to determine whether to change the state of one or more lighting fixtures of the plurality of lighting fixtures.

18. The master controller of claim 15, wherein the processing circuit is configured to recognize an ambient light signal received from one of the plurality of lighting fixtures at the wireless transceiver and to determine whether to change the state of one or more lighting fixtures of the plurality of lighting fixtures in response to the received ambient light signal.

19. The master controller of claim 15, wherein the override signal is based on a load shed signal received from a source remote from the master controller.

20. The master controller of claim 19, wherein the load shed signal is received at a network interface of the master controller from a utility provider.

21. The master controller of claim 15, wherein the master controller is configured to transmit control information for a second lighting fixture by first transmitting the control information to a first lighting fixture for retransmission.

* * * * *